United States Patent [19]

Matsukane et al.

[11] Patent Number: 5,467,341
[45] Date of Patent: Nov. 14, 1995

[54] APPARATUS AND METHOD FOR ALERTING COMPUTER USERS IN A WIRELESS LAN OF A SERVICE AREA TRANSITION

[75] Inventors: Edward H. Matsukane, Rancho Santa Margarita; Ryan H. Tze, Irvine, both of Calif.

[73] Assignee: Toshiba America Information Systems, Inc., Irvine, Calif.

[21] Appl. No.: 227,528

[22] Filed: Apr. 14, 1994

[51] Int. Cl.$^6$ .................................................. H04J 3/14
[52] U.S. Cl. ........................... 370/17; 370/94.1; 371/5.5; 455/67.1
[58] Field of Search ................. 370/13, 13.1, 17, 370/79, 84, 94.1, 110.1; 371/5.1, 5.5, 32, 33, 20.1, 20.2, 67.1, 68.2, 68.3, 69.1; 455/33.1, 53.1, 54.1, 54.2, 56.1, 67.1, 67.3, 67.7; 379/58, 59, 63; 340/825.06, 825.16, 825.17, 825.36; 395/100, 162, 163

[56] References Cited

U.S. PATENT DOCUMENTS

| | | | |
|---|---|---|---|
| 4,456,793 | 6/1984 | Baker et al. | 379/56 |
| 4,490,817 | 12/1984 | Turner | 370/17 |
| 4,639,914 | 1/1987 | Winters | 455/54.1 |
| 4,710,924 | 12/1987 | Chum | 371/20.1 |
| 4,713,810 | 12/1987 | Chum | 371/20.1 |
| 4,730,313 | 3/1988 | Stephenson et al. | 371/5.5 |
| 4,796,301 | 1/1989 | Uzawa et al. | 455/607 |
| 4,809,257 | 2/1989 | Gantenbein et al. | 359/118 |
| 4,829,519 | 5/1989 | Scotton et al. | 455/67.3 |
| 4,876,742 | 10/1989 | Vacon et al. | 455/66 |
| 4,878,049 | 10/1989 | Ochiai et al. | 371/20.1 |
| 4,970,714 | 11/1990 | Chen et al. | 370/17 |
| 5,010,583 | 4/1991 | Parken | 455/15 |
| 5,036,515 | 7/1991 | Freeburg | 371/5.5 |
| 5,079,628 | 1/1992 | Tomikawa | 455/5.1 |
| 5,099,346 | 3/1992 | Lee et al. | 359/110 |
| 5,103,461 | 4/1992 | Tymes | 370/17 |
| 5,131,010 | 7/1992 | Derrenge et al. | 375/100 |
| 5,134,708 | 7/1992 | Marui et al. | 455/67.7 |
| 5,142,550 | 8/1992 | Tymes | 370/94.1 |
| 5,260,942 | 11/1993 | Auerbach et al. | 370/94.1 |
| 5,317,563 | 5/1994 | Oouchi et al. | 370/17 |

*Primary Examiner*—Alpus Hsu
*Attorney, Agent, or Firm*—Banner & Allegretti, Ltd.

[57] ABSTRACT

An apparatus and method is provided for detecting when a mobile computer linked to a computer server over a wireless link is about to move out of the range of the LAN and for alerting the computer user before the communication link with the computer server becomes severely deteriorated. According to the apparatus and method, a predetermined number of data packets are periodically transmitted from the mobile computer to the computer server, and the number of data packets successfully transmitted is determined based on acknowledgments received from the computer server, preferably using a cyclical redundancy check (CRC) code in the transmitted packets. Based on the number of data packets successfully transmitted, a transmission error rate is computed. The error rate is compared to a threshold value and, if the threshold is exceeded, an indication is provided to the user that the communication quality is deteriorating. Parameters for controlling the number of predetermined packets, the time interval for repeating the transmissions, the method of indication, and the thresholds may be changed by the user to adapt to different requirements and environments. In a preferred embodiment, transmission of the predetermined number of data packets is inhibited if communication has been made with the computer server during a predetermined time interval, thereby improving efficiency. Additionally, a background error rate may be computed from which one or more threshold values are adjusted in order to adapt to noisy environments.

30 Claims, 7 Drawing Sheets

APPARATUS AND METHOD FOR ALERTING COMPUTER USERS IN A WIRELESS LAN OF A SERVICE AREA TRANSITION

BACKGROUND OF THE INVENTION

1. Technical Field

This invention relates generally to wireless local area networks (LANs), and, more particularly, to an apparatus and method for detecting when a computer user in a wireless LAN is about to move out of a service area of the LAN.

2. Related Information

Local area networks which allow a plurality of computers to communicate among themselves and with a network server are well known in the art. A detailed discussion of such networks, including communication standards and network topologies, is provided in the book *Networking Personal Computers, 3rd edition*, by Michael Durr and Mark Gibbs, copyright 1989 by Que Corporation of Carmel, Indiana, incorporated herein by reference.

As computers have become smaller and more portable (e.g., so-called "laptop" and "notebook" computers), computer users are able to move about more freely and, in particular, to operate their computers while traveling. Through the use of a modem and a cellular telephone, portable computer users have been able to communicate with other computers hundreds or thousands of miles away without the need to connect to a wire network. Cellular phone-based connections, however, presently have disadvantages such as high equipment cost, high telephone charges, and bandwidths limited to audio frequencies.

The use of wireless networks for communicating among computers is also well known in the art. Such networks allow computers to be moved within a particular physical area ("service area") without regard to physical connections among the computers. These networks may employ infrared light or radio wave propagation as the transmission medium. However, the use of these mediums may result in decreased transmission reliability for a variety of reasons such as radio frequency interference or transmission path obstructions. Therefore, such wireless networks often include one or more mechanisms to compensate for the decrease in transmission reliability. Such mechanisms may be preventive in nature, such as the use of spread-spectrum radio transmission to avoid radio frequency interference, or they may be corrective in nature, by detecting a transmission error and retransmitting data which was improperly transmitted.

The advent of wireless networks has benefited portable computer users. Although primarily developed to serve relatively fixed computer configurations in office buildings where the expense of installing coaxial cable or other more permanent network media would be expensive or destructive, wireless networks are increasingly being used to connect portable computers for purposes of user convenience. For example, a group of portable computers may communicate within an area served by the wireless network, allowing portable computer users in such a network to move freely around the area while maintaining communication with the network.

As a more specific example, in a large warehouse environment in which inventory is checked and maintained by computer, it may be desirable to provide one or more portable computers linked via a wireless network to a central computer, wherein one or more of the portable computers may be moved about the large warehouse and operated to update database entries based on inventory observations. As changes are made from a portable computer, they may be transmitted immediately via the wireless LAN to the central computer on the warehouse premises, instead of waiting until later and downloading such data. Conversely, data may be remotely retrieved from the central computer to the portable computers over a wireless network.

As another example, in a large retail store environment, it may be desirable to provide portable computers wirelessly linked to a central computer to monitor alarms, provide demonstrations, or maintain inventory. Office buildings provide yet another environment in which it may be advantageous to configure portable computers in a wireless network, so that portable computers may be taken into conference rooms, outside the building, or among offices.

In the foregoing environments in which portable computers are connected by a wireless network, a problem exists with regard to the degree of mobility. Unlike a cellular network with overlapping "cells" which allow a user to move between areas, conventional wireless networks only provide communication coverage over a limited area. This area is typically restricted by the distance between the server and the portable computers, or by obstructions such as large buildings or underground premises. Moving outside this area, or to an area in which communication is obstructed, results in disconnection from the network.

Unfortunately, there is usually no way for a portable computer user to detect when he or she is about to move out of range of the wireless network or is moving into an area in which signal obstructions may inhibit or prevent communication with the central server. Of course, if the portable computer user is presented with error messages indicating total loss of communication or an obvious lack of response from the central server, it is too late. Thus, a problem exists in that there is no accurate and reliable method of informing a user of a wireless portable computer linked to a network (hereinafter "mobile computer") that he is about to move out of the service area of the wireless network before the communications link becomes seriously deteriorated.

Methods of measuring signal strength as an indirect indicator of communication quality, while adequate for analog voice communications, do not accurately predict the quality of communications where data packets are transmitted relatively infrequently between computers. For example, erroneously transmitted data packets can be easily retransmitted between computers with little or no negative effect to the mobile computer user, and thus the communications quality (as perceived by the computer user) can be high even when signal strength is low or fading. Thus, using signal strength (or a related measurement) to determine communications quality in a wireless network is disadvantageous.

Conventional methods of measuring communication quality also do not allow a computer user to adjust the means by which the communications quality is determined in order to compensate for different data communications environments such as noisy environments or different data communications speeds. Allowing a user to individually adjust how the communications quality is determined would allow the user to more accurately monitor the actual communications quality (i.e., the ability to exchange computer data) under various conditions. As an example, it would be desirable to allow an individual user to adjust one or more thresholds which are used to determine that the communications quality is deteriorating, so that severe deterioration could be tolerated where data exchanges are infrequent.

The inventors of the present invention have found that determining the communications quality between a mobile computer and a central computer server is best effected by measuring the packet transmission error rate rather than the quality of the signal on which the data is modulated. The related art contains other limitations relating to wirelessly networked computers which will become apparent through the following discussion.

Conventional technology provides partial solutions to measuring communications quality between two or more devices which communicate wirelessly. For example, cellular radio telephone devices may include an alarm to indicate to a user that the strength of a radio frequency signal has decreased below a certain value when the telephone user reaches the boundary of a zone. However, as pointed out previously, using signal strength to evaluate the communications quality imposes disadvantages where digital data packets are transmitted between computers. Moreover, the user has no control over how the communications quality is measured, thereby producing undesirable results in noisy environments where, for example, a high error rate may be tolerable.

The related art also generally discloses the use of bit error rates measured between a base station and a mobile receiver for selecting, when a predetermined threshold is reached, a neighboring zone transmitting at a lower error rate. However, such devices do not provide an indication to the user that he is about to move out of a service area, thereby allowing him to move back within the area before communications with a base station is lost. Moreover, such devices do not allow the user to adjust the means by which communications quality is determined, thereby incurring the disadvantages outlined above.

The related art also allows wireless communications among a group of computers and peripherals using packet switching protocols which enable two-way error free transfer of data, while accommodating breaks in the communications path. Data packets may be retransmitted when errors are detected, the errors being detected through the use of a cyclical redundancy check (CRC). When a predetermined number of retransmission attempts has been made, a particular link may be deemed to be "down". However, such systems do not measure the transmission error rate (i.e., errors as a function of time), thereby limiting their ability to detect changes in transmission quality over time. Moreover, because error thresholds are predetermined, the systems cannot adapt to noisy environments or circumstances in which the transmission quality varies over time. No warning or alert is provided to a user in such a network that the user is approaching the outer limits of a service area, which might otherwise allow the user to move back within the service area to prevent further deterioration or disconnection from the network. Thus, what is needed is a system and method for solving these problems.

SUMMARY OF THE INVENTION

The present invention solves the aforementioned problems by providing a method and apparatus for alerting a mobile computer user that he or she is about to move out of the service area of a wireless LAN. More specifically, a mobile computer user is alerted when the quality of communications with a wirelessly networked server deteriorates below a specified level. Embodiments of the present invention contemplate that the communications quality may be periodically determined in accordance with a cyclical redundancy check (CRC) using data transmitted between the mobile computer and the server.

Various embodiments of the present invention contemplate sending data packets between a mobile computer and a wirelessly networked server, receiving acknowledgment packets in response thereto, and evaluating the communications quality by determining how many data packets were erroneously transmitted and comparing this number with a threshold. The resulting communications quality is indicated to the mobile computer user. A predetermined number of data packets may be transmitted at regular time intervals to periodically measure the communications quality.

Embodiments of the present invention contemplate various features, including allowing the user to adjust one or more of the parameters used for evaluating the communications link quality; automatically testing the communications quality only when no data communications has taken place between the mobile computer and the server during a previous time interval, thus increasing efficiency; computing a "background" error rate of the environment against which thresholds may be automatically adjusted; indicating the degree of communications quality using different indicators for different degrees of communication quality; and providing a system which can be adapted to operate with commercially available notebook or laptop computers without the need for special non-standard hardware modifications. Additional advantages of the present invention will become apparent through the following detailed explanation and the drawings incorporated herein.

DETAILED DESCRIPTION OF THE PREFERRED EMBODIMENTS

Figure 1:
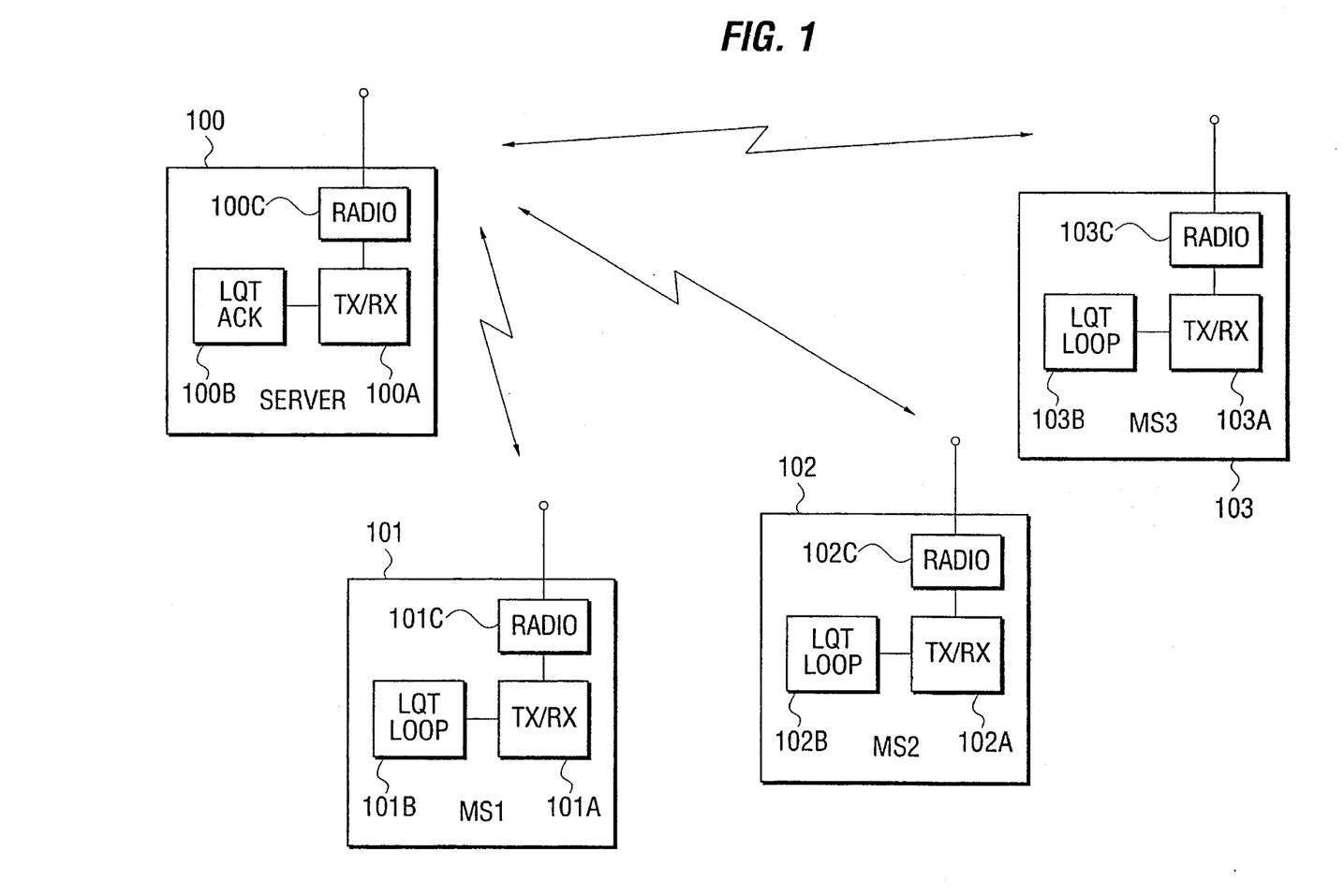
FIG. 1 shows a wireless computer network configured in accordance with one embodiment of the present invention comprising a computer server and a plurality of mobile stations.

FIG. 1 shows a wireless computer network configured to operate in accordance with the principles of the present invention. A server 100 communicates with mobile stations 101, 102, and 103, preferably using radio frequency propagation. Any suitable wireless communication method and apparatus may be used; a preferred embodiment uses spread spectrum transmission in the 2.4 to 2.4835 GHz RF band to minimize radio frequency interference. Wireless networks which allow a plurality of terminals to communicate using radio frequency transmission are well known. A representative example is shown in U.S. Pat. No. 4,639,914 to Winters, incorporated herein by reference. Furthermore, the characteristics of spread spectrum communication systems are generally well known and details are omitted herein.

Although not explicitly shown in FIG. 1, each mobile station may communicate with server 100 within a "service area", the boundaries of which are generally determined by a number of factors including the distance from the server, the type of obstructions between the mobile station and the server, and the existence of radio frequency interference.

Various embodiments of the present invention contemplate that each mobile station 101, 102 and 103 is assigned a unique address for communicating with server 100, such that when server 100 broadcasts data packets to the entire service area, each mobile station responds only to data packets which are addressed to that station. Conversely, each mobile station communicates with server 100 by transmitting data packets to the server's known address, and the other non-transmitting mobile stations ignore such data packets. However, the invention is not limited in this regard, and it can be appreciated that communication among the mobile stations may be effected as long as each mobile station knows the addresses of the other mobile stations or transmits data packets to a commonly known group address comprising one or more of the other mobile stations.

Each mobile station may transmit data to and receive data from server 100 using a transmit/receive protocol, such as a seven layer protocol conforming to the well-known International Standards Organization Open Systems Interconnect (ISO/OSI) model. Data is preferably transmitted in individual data packets. Each mobile station may comprise one of any number of portable computers, such as a Toshiba model T4500, T4600, T6400, or T6600, operating under such software as MS-DOS™, Microsoft Windows™, or OS/2™ from IBM Corp. The Novell Netware™ software utility may also be included to provide a portion of the transmit/receive protocol. Various embodiments or portions of the present invention may be incorporated into a software utility provided as value-added software for workstations with wireless LAN interface cards.

Various embodiments of the present invention contemplate that communications quality between each mobile station and server 100 is evaluated by way of a Link Quality Test. A Link Quality Test (LQT) consists of transmitting a predetermined number of LQT data packets from one of the mobile stations to server 100 to evaluate the quality of the transmission link between the transmitting mobile station and server 100. Each LQT data packet may contain an identifier it which identifies as separate from other data packets transmitted between the mobile station and server. The number of LQT data packets may be designated by a user-defined variable, indicated hereinafter by N. If no user-supplied value is provided, it may be provided as a default. It is within the scope of this invention that the predetermined number of LQT data packets may be provided by other means, such as automatically selecting a quasi-random number, or computing a predetermined number based on any number of conditions such as the error rate.

Each LQT data packet preferably contains at least 14 data bytes, although the invention is not limited in this respect. The LQT data bytes may comprise a predetermined or random sequence of bytes; the specific contents of these data bytes are not important to the operation of the invention. Each LQT data packet also contains a Cyclical Redundancy Check (CRC) code, preferably 32 bits, which is computed in accordance with conventional well-known methods according to the data bytes in the LQT packet, and is used by server 100 to determine whether the data packet was received without error. By performing an LQT, each mobile station can independently evaluate its communications quality with server 100. Other non-LQT data packets may also comprise a CRC in accordance with well-known methods in order to determine whether transmission errors have occurred even when an LQT is not being performed.

For each LQT, a total of N LQT data packets are transmitted sequentially from mobile station 101 to server 100, and statistics observed from sending the data packets are computed. For example, the number of packets retransmitted due to errors or failure of acknowledgment (out of the N data packets transmitted) may be computed. The N data packets are sent at periodic intervals of T seconds. The interval T may be supplied by each mobile station user, so that each user may define how many seconds elapse between each series of N packets. Lengthening the interval, for example, would reduce the computational burden on the CPU within each mobile station, while shortening the interval would provide a more up-to-date measurement of link quality.

The communications quality may be presented to each user according to a user-defined method, hereinafter referred to as M. Examples of indication methods include beeps emitted from mobile station 101, wherein the frequency of the beeps corresponds to the link quality, or a display indicator such as a number of markers on a display, wherein the number of markers represents the quality of the link. The user may enable or disable the Link Quality Test by specifying that a Service Area Alert option should or should not be activated.

Each mobile station may contain an LQT configuration file in which the parameters N, T and M are stored. These parameters may be modified by each user to tailor the Link Quality Test to the user's preference or to minimize the load on the CPU. Additional parameters, such as one or more thresholds THR, may be stored in the file to further define the characteristics of the Link Quality Test, as explained more fully herein.

Referring to mobile station 101 by way of example, each mobile station comprises a radio circuit 101C including hardware for transmitting and receiving radio signals, a transmit/receive (TX/RX) component 101A which provides an interface for communicating with server 100 through a corresponding TX/RX component 100A in server 100 (preferably according to a protocol conforming to the aforementioned ISO model), and LQT LOOP 101B which controls the Link Quality Test and indicates the results to the user of mobile station 101. TX/RX 101A and LQT LOOP 101B can be implemented in hardware or in software running on a CPU in mobile station 101; other computer programs may also operate in mobile station 101 through the use of a suitable operating system such as MS-DOS™. Each component of the mobile stations necessary to practice the invention will now be described in turn.

Radio circuit 101C may be implemented using any suitable device which preferably modulates an RF carrier. The particular type of radio transmission used is not critical. One contemplated approach uses Direct Sequence Binary Minimum Shift Key (MSK) modulation with 100 milliwatts of power per mobile station. The radio circuit may be combined with the functions of TX/RX 101A on a suitable communications adapter card which is compatible with a computer backplane contained in each mobile station. An example of a commercially available wireless network card is the NCR WaveLAN™.

The functions of TX/RX 101A, identical to that of 102A and 103A of the other mobile stations, are essentially twofold, and can be readily implemented in hardware or programmed using a suitable computer language by one of ordinary skill in the art, as follows:

(1) Accept requests from LQT LOOP 101B to transmit LQT data packets to server 100, calculate a CRC value based on data values in each LQT data packet and insert the calculated CRC into each LQT data packet, provide handshaking with the radio circuit 101C to effect the actual data transfer to server 100, and wait for an acknowledgement of the transmission from server 100. In addition to LQT packets, transmission requests for other types of data packets may be received from application programs running on mobile station 101, which TX/RX 101A will also transmit to server 100 through radio circuit 101C.

(2) Receive data packets transmitted from server 100, determine whether each received packet is an acknowledgment of a previously transmitted packet and, if so, update communication quality statistics accordingly. If, after a predetermined time interval, no acknowledgment is received for a corresponding transmitted data packet, the packet is re-transmitted to the server and the communications quality statistics are revised accordingly to reflect the presumably "lost" packet. Further details regarding the statistics are provided hereinafter.

The functions of LQT LOOP 101B, which may be readily implemented in hardware and/or programmed using a suitable computer language in accordance with FIG. 2 and the detailed description herein, are as follows:

(1) Retrieve user-supplied LQT parameters for controlling the Link Quality Test.

(2) Send LQT packets to server 100 in accordance with the LQT parameters on a periodic basis.

(3) Retrieve transmission quality statistics from TX/RX 101A, compare them with predetermined, user-supplied, or computed thresholds, and determine the link quality.

(4) Display or otherwise indicate the link quality, including any possible alerts, to the user of mobile station 101.

Further details of various embodiments of the invention will now be described in conjunction with FIG. 2, which illustrates a sequence of steps executed by LQT LOOP 101B. It is also contemplated that these steps are identically but independently executed by LQT LOOPs 102B and 103B.

Figure 2:
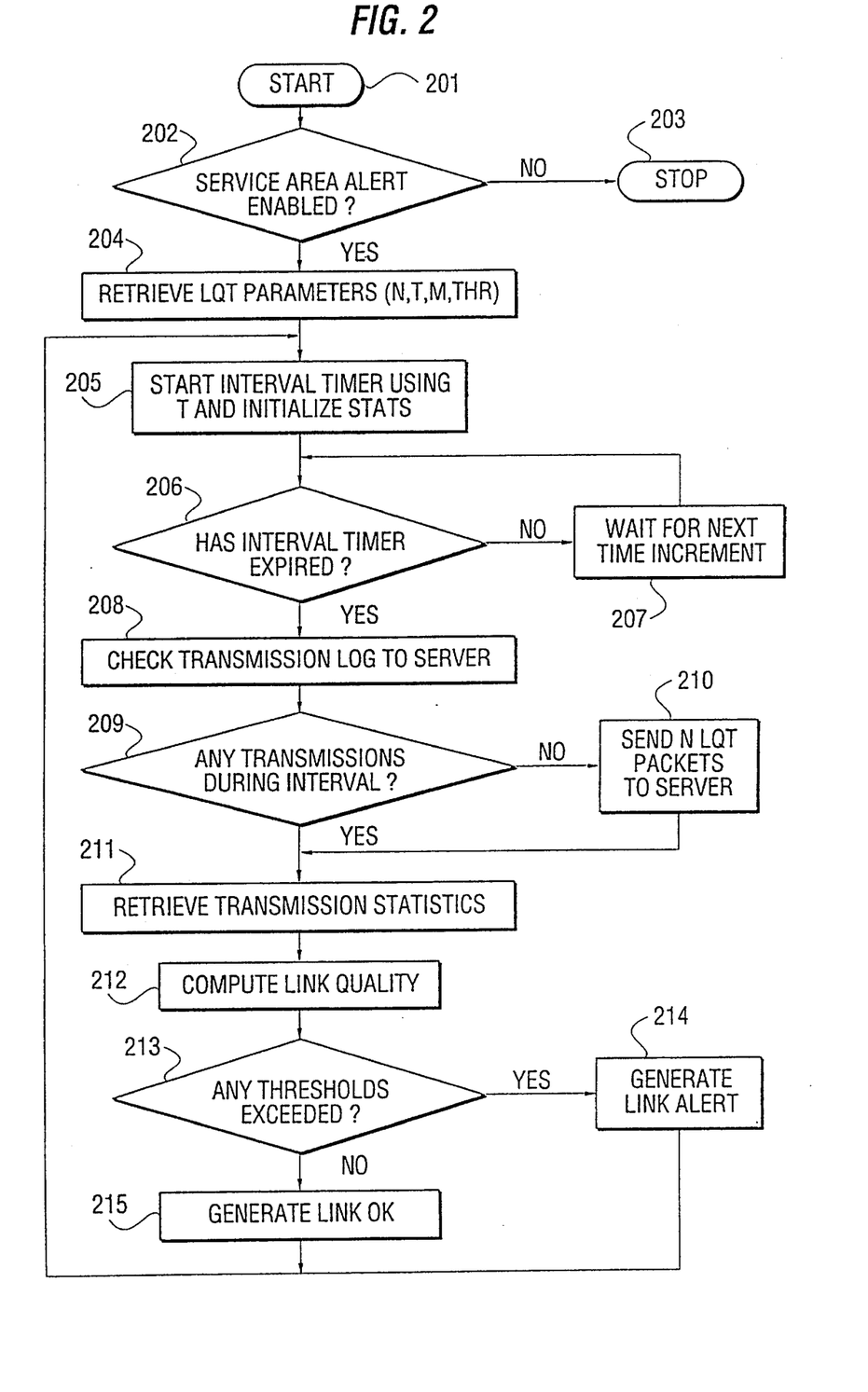
FIG. 2 shows a flow chart illustrating a procedure for carrying out steps according to various embodiments of the present invention executed on one of the mobile stations.

At step 201 in FIG. 2, the LQT LOOP is initialized after power is applied and the mobile station computer is booted. At step 202, a test is made to determine whether the Service Area Alert option has been enabled by the user; this selection may be a simple set-up parameter in mobile station 101. If not enabled, the LQT LOOP terminates at step 203. If the Service Area Alert has been enabled, then the LQT parameters N, T, M, and one or more thresholds THR are retrieved, for example from a configuration file which may be modified by the user.

An interval timer set according to time interval T is started at step 205, and the link quality statistics are initialized. Thereafter, a test is made in step 206 to determine whether the interval T has expired. If T seconds have not yet elapsed, the process loops back to step 206 after waiting for a suitable time increment in step 207. If T seconds have elapsed, a check is made in step 208 to see whether mobile station 101 has transmitted any non-LQT data packets to server 100. If, in step 209, it is determined that non-LQT data packets have been transmitted to server 100 (as might occur during normal communications between the server and mobile station), then the transmission statistics associated with these transmissions are retrieved in step 211. Further details of these statistics are provided below.

If mobile station 101 has not transmitted any data packets to server 100, step 210 is executed. In step 210, a total of N LQT packets are sent in sequence to server 100. As explained above with respect to TX/RX 101A, an acknowledgment packet will be returned from server 100 for each LQT packet which was received error-free at server 100. In accordance with various embodiments of the invention, LQT packets are only transmitted when no data communication (or insufficient data communication to provide meaningful statistics) has already taken place from mobile station 101 and the server. This feature can be seen in FIG. 2 with reference to steps 208 and 209. This increases the efficiency of the Link Quality Test and reduces the computational burden on mobile station 101. Sending LQT packets to server 100 when transmission statistics are already available would be wasteful and can therefore be avoided.

After the packets have been successfully sent to server 100, the transmission statistics are retrieved in step 211. In step 212, the link quality is computed according to the transmission statistics. In a preferred embodiment, the link quality is determined as a function of the number of packet retransmissions which occurred during the time interval T. For example, if 58 total data packets were transmitted during interval T, but 2 of these 58 data packets were retransmissions due to lack of acknowledgements from server 100, the link quality would be computed at 56/58=97% (or an error rate of 3%). Other methods of computing link quality based on the number of retransmissions are, of course, possible. However, it is important to the present invention that the link quality be computed on the basis of erroneously transmitted (or "lost") data packets rather than using an indirect indicator such as signal quality.

After the link quality is computed in step 212, the link quality is compared to one or more thresholds in step 213. Thus, for example, a first threshold could be set at 90%, a second at 80%, and a third at 50%. These thresholds may be user-adjustable to compensate for noisy environments or indifference on the part of the user. A different grade of indicator may be provided to the user for each threshold crossed. For example, when the 90% threshold is crossed, an infrequent audible beep may be provided, whereas when the 50% threshold is crossed, a more persistent audible beep may be provided. In this manner, the user is made aware of the degree of deterioration.

As an example, in a low-throughput environment where very few data packets are transmitted from the mobile computer 101, a relatively low link quality can be tolerated by the user before it becomes noticeable to him. On the other hand, where the mobile user regularly transmits large quantities of data, a link quality of 50% might be intolerable. Therefore, the ability to adjust the one or more thresholds provides flexibility to allow individual users to tailor their environment.

In step 214, if one or more thresholds are exceeded, a link alert may be provided in accordance with method M (selected by the user or provided as a default). For example, if link quality falls below the third threshold, a repeated beeping sound may be provided to alert the user. Alternatively, a display may be provided in a pop-up window at the mobile station 101 to indicate the alert. In step 215, if no thresholds have been exceeded, no alert will be provided, and a suitable indicator may be supplied instead to indicate good link quality.

Instead of supplying separate signals at steps 214 and 215, a single indicator may be provided such as a series of colored dots, a "fuel gauge" type of meter may be displayed, or any other means of correlating the link quality with the display or audible capabilities of the mobile station 101 may be used. Optional short and long repeated "beep" sounds may be used to signal the degree of link deterioration.

After the link quality has been evaluated and displayed, the process loops back to step 205 where the time interval T is again started and the link statistics are re-initialized. Instead of re-initializing the link statistics, various embodiments of the present invention contemplate maintaining a running average over multiple time intervals and providing a corresponding indication thereof. It is of course also possible to allow the user to modify the running time average, so that the user may specify the time over which the statistics will be averaged. This may be desirable, for example, to avoid falsely alerting the user where a very short interruption occurs.

In other embodiments, the link quality may be determined not with respect to absolute errors, but with respect to a "background" error rate which depends on the particular environment. Thus, for example, after step 204 and prior to step 205, steps may be inserted into the sequence of FIG. 2 which transmit a plurality of LQT packets to server 100 to measure the number of errors detected over an initial time interval (for example, 10 seconds). The number of errors detected during this interval may then be used as a "background" packet transmission error rate and the thresholds (and one or more other parameters) may be adjusted according to this background rate. This may provide advantages in a noisy environment where the user is more concerned with the relative deterioration in link quality than with the absolute quality.

Moreover, additional steps may be inserted in the sequence of FIG. 2 which measure the derivative of the error rate; that is, its rate of change over time. A rapid drop-off in link quality would be cause for more alarm than would a slow decline. This approach could provide a more adaptive solution to the problem of changing environments. Of course, the present invention contemplates many variations of measurements of link quality, and these are intended to be illustrative examples only.

The following statistics may be maintained by TX/RX 101A and used to compute link quality:

Total number of packets transmitted

Total number of packets received

Total number of packets erroneously transmitted (not acknowledged)

Total number of packets received containing errors (bad CRC)

Total number of packets retransmitted

Figure 3:
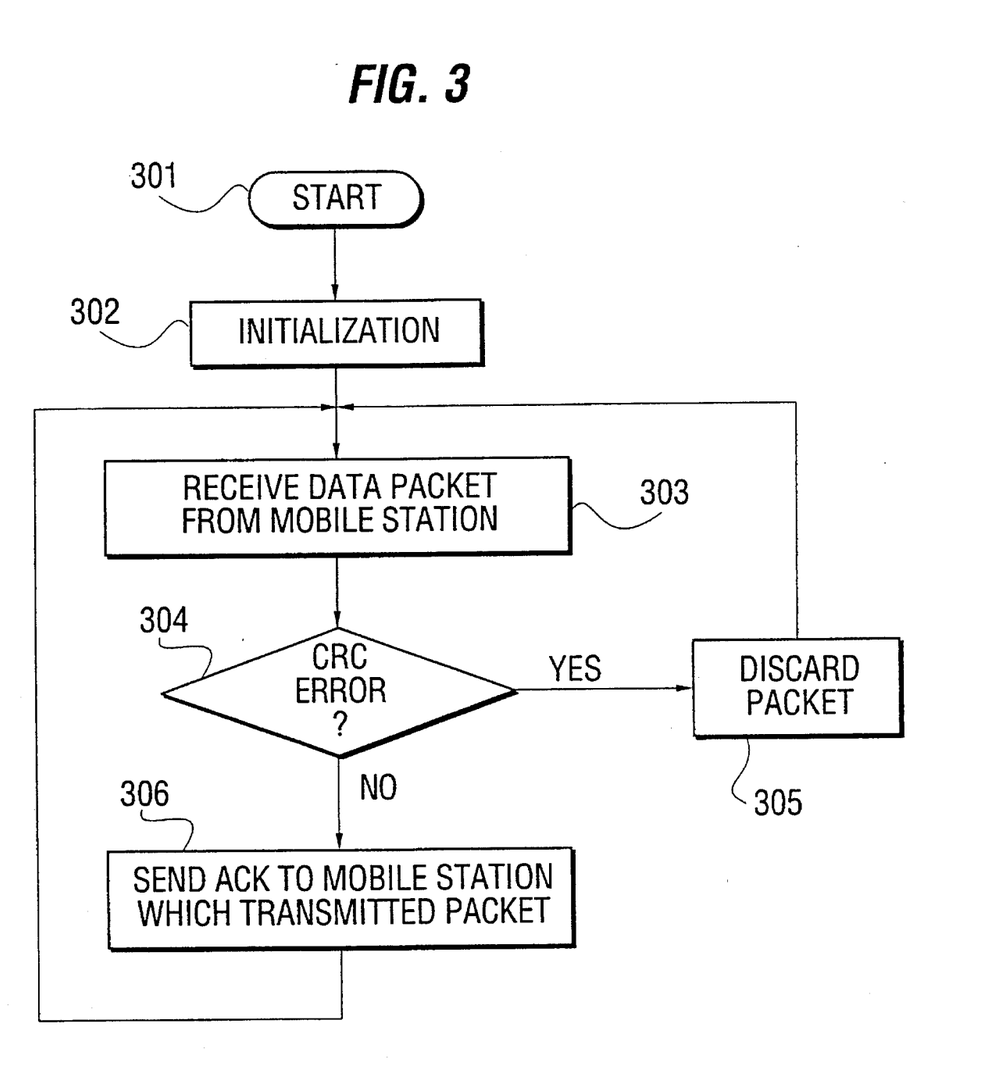
FIG. 3 shows a flow chart illustrating a procedure for carrying out steps according to various embodiments of the present invention executed on the computer server.

FIG. 3 illustrates, as contemplated by various embodiments of the present invention, a sequence of steps executed on server 100 to acknowledge LQT data packets which are sent by any of the mobile stations. This sequence of steps is executed by LQT ACK module 100B in server 100 to allow the mobile station to produce transmission statistics. Although not shown explicitly in FIG. 3, all data packets transmitted from the mobile stations are preferably acknowledged, whether they are LQT packets or not. Acknowledging all packets, while not required, allows transmission statistics to be computed based on normally transmitted data packets as outlined above.

Beginning at step 301 in FIG. 3, LQT ACK module 100B is started. Any necessary initialization, such as setting up communication parameters with TX/RX 100A, is accomplished in step 302. In step 303, an incoming data packet is received from one of the mobile stations. In step 304, it is determined if the data packet contains a CRC error and, if so, the packet is discarded in step 305. If the packet was received without error, an acknowledgment (ACK) packet is transmitted back to the mobile station in step 306.

Figure 4:
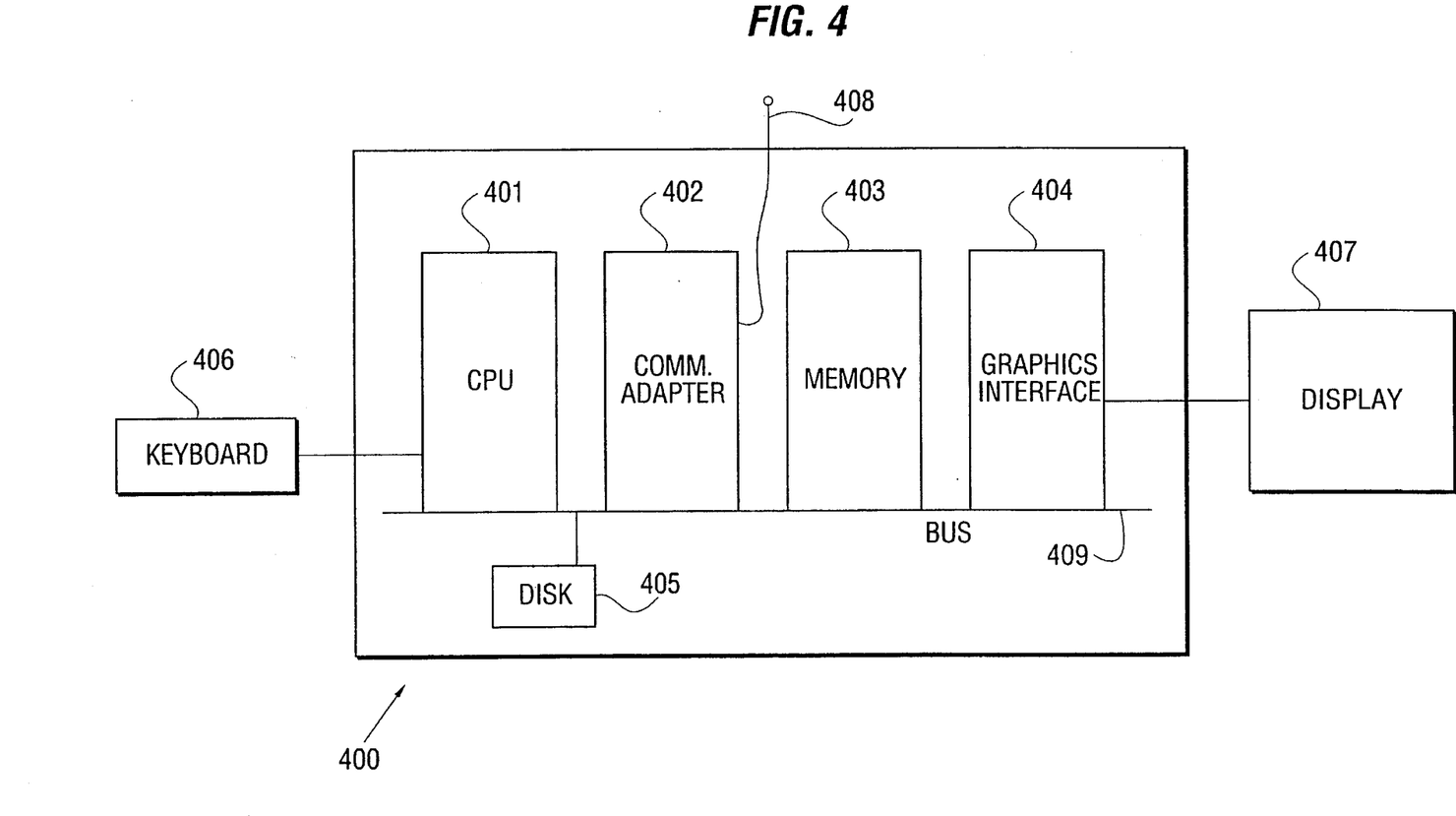
FIG. 4 is a block diagram showing a configuration for one of the mobile stations, in a mobile computer package, as contemplated by various embodiments of the present invention.

FIG. 4 illustrates a preferred configuration for mobile stations 101, 102 and 103. In various embodiments, CPU 401 comprises an IBM PC-compatible processor which is plugged into bus 409 adjacent communications adapter 402, memory 403, and graphics interface 404. A keyboard 406 is provided to allow the user to set parameters and enter other data for applications executing on CPU 401. Of course, other peripherals and interface devices can be coupled to mobile station 400, as is well known in the art.

Communications adapter 402, discussed in more detail with reference to FIG. 6, preferably includes radio circuit 101C and interface hardware or software which allows LQT LOOP 101B and TX/RX 101A to transmit and receive data packets. Communications adapter 402 may comprise a wireless network interface card compatible with computer bus 409; the commercially available NCR WaveLAN υ card is one example of a card which provides wireless communications capabilities. Alternatively, a suitable card may be readily constructed using one or more commercially available microprocessors, memory devices and interface logic coupled to any suitable radio circuit. The particular structure is not critical to the construction or practice of the present invention, and one of ordinary skill in the art will recognize that engineering tradeoffs among form factors, power consumption, speed, and other factors will dictate the particular implementation.

Portions of LQT LOOP 101B and TX/RX 101A may be implemented as separate hardware components or computer programs executing on or in conjunction with CPU 401 and a microprocessor in communications adapter 402, respectively, or they may be combined by utilizing only CPU 401. However, implementing one or more portions of TX/RX 101A in a computer program on communications adapter 402 may reduce the computational burden on CPU 401. Tradeoffs between processing speed and complexity which could result in different allocations of software and hardware functions between CPU 401 and communications adapter 402 are well known in the art and are not included herein. An antenna 408 is provided for receiving and transmitting the radio frequency signal generated from communications adapter 402. In the preferred frequency band, an antenna length of one inch or so is sufficient, assuming a dipole quarter wavelength configuration.

Display 407 may be any type of suitable display device such as a liquid crystal display (LCD) of either a passive or active matrix type, and graphics interface 404 may be one of the many standard types available such as VGA. A disk unit 405 may also be provided for storing an LQT parameter file as described above with reference to FIG. 2.

Figure 5:
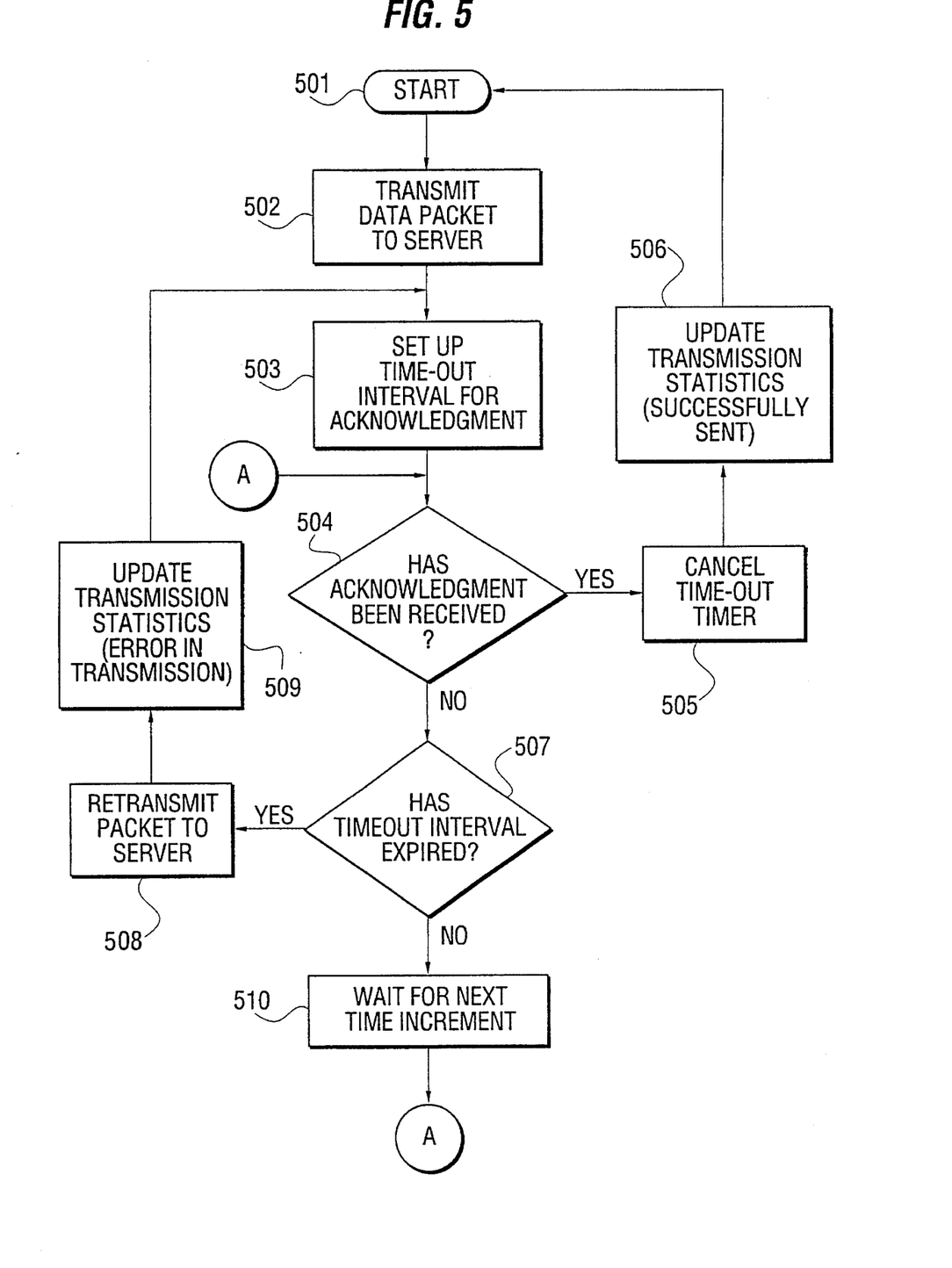
FIG. 5 shows a method of retransmitting data packets and updating statistics within TX/RX 101A of FIG. 1.

FIG. 5 illustrates, in various embodiments contemplated by the present invention, how data packets may be retransmitted and transmission statistics updated by TX/RX 101A. The sequence in FIG. 5 is executed for each data packet transmitted by TX/RX 101A, whether the data packet is an LQT data packet or another type of data packet transmitted from an application program executing on mobile station 101.

In step 501, it is assumed that a data packet is presented to TX/RX 101A for transmission to server 100. In step 502, the data packet is transmitted to server 100 through radio circuit 101C. In step 503, a time-out interval timer is set up for receiving an acknowledgment from server 100. In step 504, a check is made to see if an acknowledgment has been received from server 100 for the previously transmitted packet (transmitted and acknowledged packets may be matched by inserting a semi-unique packet number into each outgoing data packet). If an acknowledgment was received at step 504, the time-out interval is cancelled in step 505 and the transmission statistics updated in step 506 to indicate the successfully transmitted packet. Thereafter, processing resumes at step 501 if there is another data packet presented to TX/RX 101A.

If an acknowledgment was not received at step 504, a test is made in step 507 to determine whether the time-out interval has expired. If not, processing proceeds to step 510 to wait a suitable time increment. Thereafter, processing resumes at point A, which again checks for an acknowledgment from server 100.

If, at step 507, the time-out interval has expired, the same packet is retransmitted to server 100 at step 508. Thereafter, the transmission statistics are updated in step 509 to indicate a transmission error, and processing resumes at step 503 with the time-out interval started again.

Variations on the process illustrated in FIG. 5 are of course possible. For example, multiple packets may be transmitted in sequence and a plurality of time-out intervals maintained, one for each transmitted packet. This would allow for parallelism in the processing to increase efficiency rather than waiting for each packet at step 510 before the next data packet is transmitted at step 502. Various queues may of course be provided to temporarily store transmitted data packets while waiting for their acknowledgment.

Figure 6:
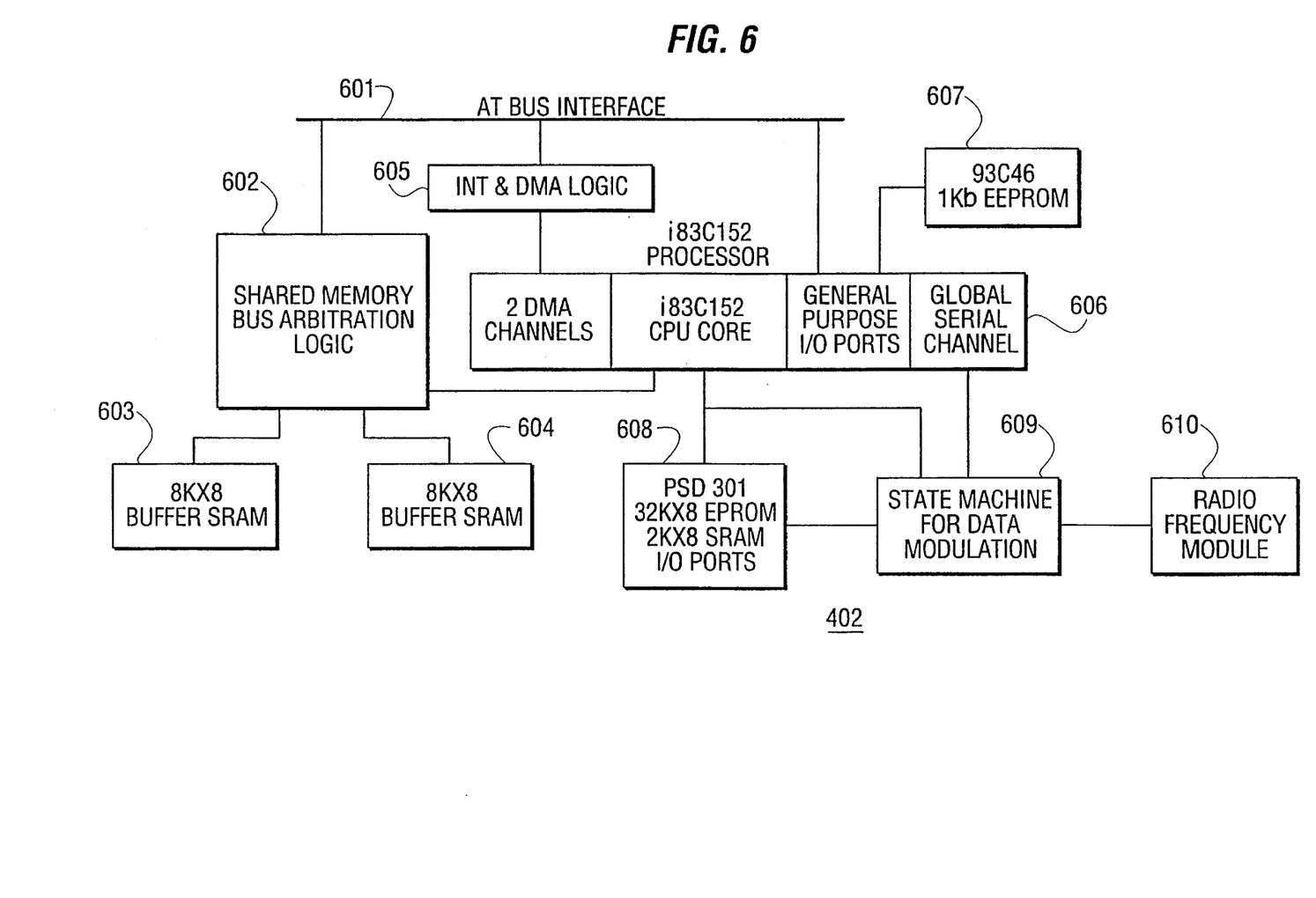
FIG. 6 is a block diagram showing one possible configuration for communications adapter 402 of FIG. 4.

FIG. 6 illustrates one possible configuration for a communications adapter such as element 402 in FIG. 4. Various embodiments of the present invention contemplate that the adapter is configured to be compatible with the well-known 16-bit AT bus 601 as shown. A 16-bit data path is contemplated for a higher data transfer rate. An I/O device ready signal (IOCHRDY) from AT bus 601 can be used to force the host CPU (element 401 in FIG. 4) to synchronize with local processor 606. Details of the AT bus standard are well known and are omitted herewith. Reference may be made to *The IBM PC/AT Technical Reference Manual*, March 1986, revised edition, part number 6280099 S229-9608-00, incorporated by reference herein.

Local processor 606 which, for example, can be an Intel i83C152 processor designed for embedded processing with serial communication capability, receives commands from the host CPU 401 to transmit and receive data. The i83C152 has seven 8-bit I/O ports, which can be programmed as address and data bus interfaces. The i83C152 contains a Global Serial Channel (GSC), which is a serial communication controller that can be programmed for many different sync/async serial communication protocols. The data to be transmitted from host CPU 401 is serialized, and data which is received through radio frequency module 610 is parallelized, in this controller.

Programmable system device 608 may comprise the PSD301 from WaferScale Integration, Inc. This device provides 32 KB of EPROM for program memory, and 2 KB of SRAM for scratch pad memory. The size, power consumption, and speed of the PSD301 make it suitable for a small package. The PSD301 also has a built-in CPU interface circuit, and therefore no "glue" logic is required for the interface between the i83C152 and this chip. Where local processor 606 is an i83C152 processor, which is a ROMless version of the i8051 family CPU, program code is stored in programmable system device 608.

Two 8KB SRAMs 603 and 604 may be mapped as shared memory between host CPU 401 (FIG. 4) and local processor 606. Dam transfer between the host CPU 401 and this shared memory (603 and 604) may be done by the host CPU using its string instructions instead of the DMA channels in the i83C152. Because the host processor 401 is preferably a 16-bit or 32-bit processor and the dam path on AT bus 601 is 16 bits wide, using the host CPU string instructions to initiate the dam movement will be much faster than the 8-bit DMA channels in the i83C152.

Shared memory and bus arbitration logic 602 may be used to solve bus contention problems. If both local processor 606 and host CPU 401 are accessing shared memory 603 and 604, this circuit generates the proper WAIT signal to disable the access of one of the processors so that the other processor may successfully access the dam. After the current cycle is done, the bus arbitration logic will grant the access to the smiled side.

Nonvolatile EEPROM 607 may comprise a 93C46 1Kb serial EEPROM, constructed as a 64 by 16-bit memory internally. This device is located in the I/O space of local processor 606, and may be used to store configuration and identification information.

RF state machine 609 may be constructed using an Application Specific Integrated Circuit (ASIC). This element may be programmed by local processor 606 with modulation information and RF control commands. RF state machine 609 is sequenced using a 32 MHz frequency crystal oscillator, and receives a digital dam bitstream from the GSC in local processor 606. RF state machine 609 then modulates the bitstream into Direct Sequence Spread Spectrum (DSSS) format for transmission, and also demodulates the received DSSS signal and returns it to the GSC.

Radio frequency module 610 may be an analog module which transmits and receives the RF signal from the antenna, for example, in the frequency band of 2.4 to 2.4835 GHz. Additionally, it contains analog-to-digital and digital-to-analog circuitry.

Figure 7:
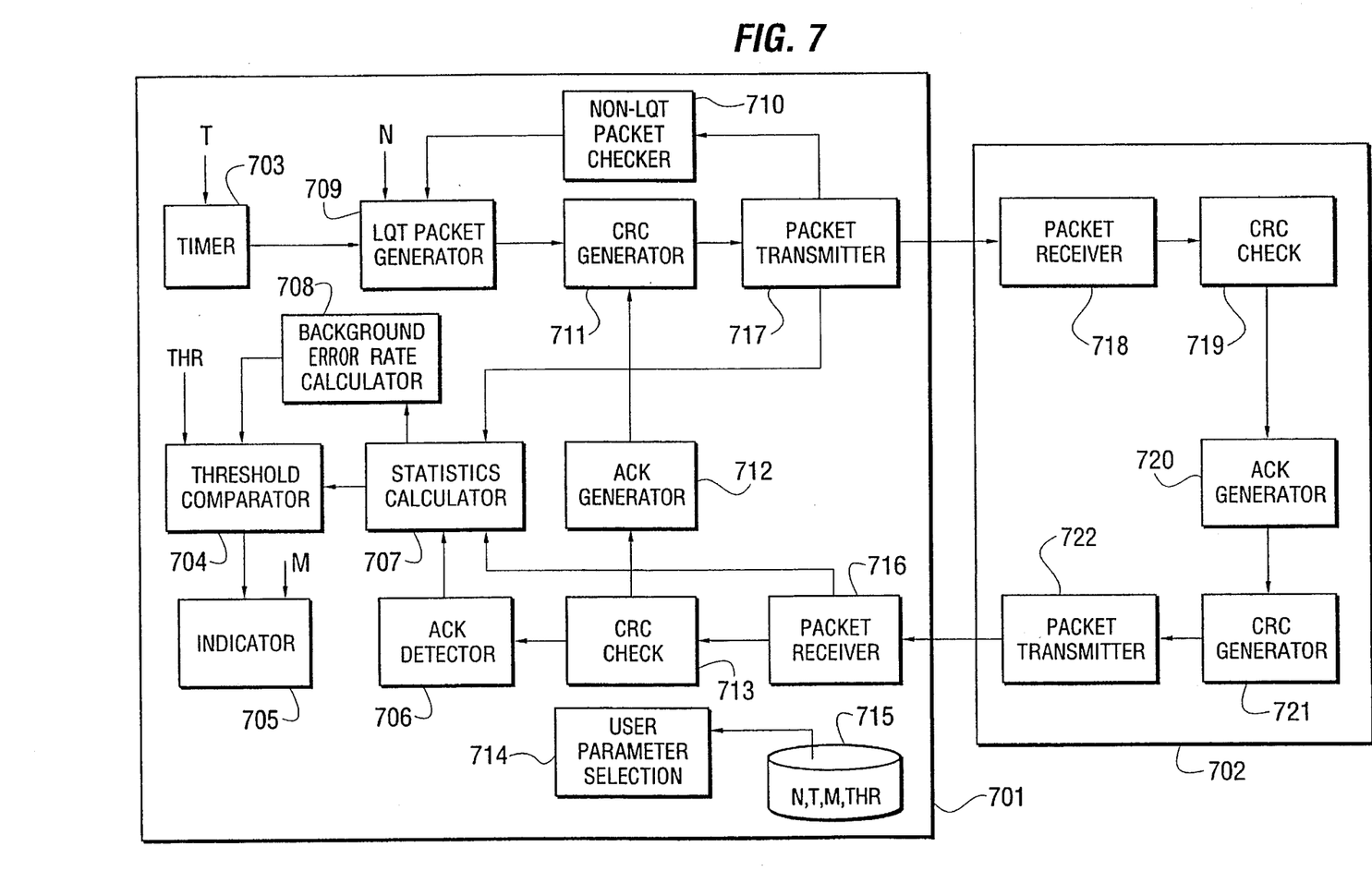
FIG. 7 is a block diagram showing additional details of one embodiment of the present invention comprising mobile station 701 and computer server 702.

FIG. 7 shows a block diagram illustrating details of one embodiment of the present invention employed in a system having a mobile station 701 and a computer server 702. In FIG. 7, mobile station 701 comprises a packet transmitter 717 for transmitting data packets, including LQT packets and non-LQT packets, to a corresponding packet receiver 718 in computer server 702. Prior to transmission, a CRC is generated for each data packet in CRC generator 711. For each packet transmitted, a counter is updated in statistics calculator 707 for evaluating the link quality.

An LQT packet generator 709, responsive to a user-supplied parameter N for controlling the number of packets to be generated for each LQT, generates LQT packets and supplies them to CRC generator 711. A non-LQT packet checker 710 detects the transmission of non-LQT packets and optionally inhibits LQT packet generator 709 in accordance with various embodiments previously explained with reference to FIG. 2. A timer 703 causes LQT packet generator 709 to generate LQT packets according to a time interval T which may be user-supplied. Parameters N, T, M, and THR as previously discussed may be retrieved from file 715 via user parameter selection 714 and supplied to the various elements as needed.

When an LQT packet is transmitted from packet transmitter 717 of mobile station 701, it is received in packet receiver 718 of server 702 and thereafter a CRC check is performed in CRC check 719 to determine if the packet was received without error. If the CRC is correct, an acknowledgment is generated for the received packet in ACK generator 720, a corresponding CRC is inserted into the acknowledgment packet in CRC generator 721, and the acknowledgment packet is transmitted back to mobile station 701 through packet transmitter 722. Packets which have an incorrect CRC value are discarded and are not provided to ACK generator 720. In this manner, an acknowledgment is generated for each data packet which is received error-free by server 702.

Acknowledgment packets are received by packet receiver 716 in mobile station 701 and for each packet received, a counter is updated in statistics calculator 707 for computing the link quality. A CRC check is performed in CRC check 713 and, if the CRC is determined to be correct, the packet is passed to ACK detector 706 to determine if the packet is an acknowledgment of a previously transmitted packet. If so, a counter is updated in statistics calculator 707 accordingly. ACK generator 712 may be used to acknowledge packets originated by server 702.

Statistics calculator 707 evaluates the link quality based on, for example, the counters discussed above, although the invention is not limited in this respect. The link quality is compared with one or more threshold values THR in threshold comparator 704. Thresholds may be modified through file 715 and retrieved via user parameter selection 714. If one or more thresholds THR is exceeded, an indicator 705 indicates the link condition in accordance with method M supplied by the user. As explained previously, these methods may include providing an audible beep or a visual indicator to the user. Background error rate calculator 708 may also be used to establish a background transmission error rate during an initial time interval. Statistics calculator 707 may also compute the derivative of the error rate as explained previously.

It will be understood by one of ordinary skill in the art that specific references to hardware or computer program components herein are by way of example only, the specific allocation of functions between hardware and software components being dictated by the particular requirements and engineering tradeoffs involved in a particular implementation. It will also be recognized that the particular ordering of various steps used to practice any methods of the present invention may be rearranged to achieve the same or substantially the same result, and that any numbering of steps in the appended claims is for ease of reference only and is not intended to limit the scope of the claimed steps to any particular order unless otherwise necessary to make the method of the invention operable.

According to the above description, there is provided a method and apparatus for alerting a mobile computer user that the quality of communications with a wirelessly linked computer server is deteriorating. It is apparent that many modifications and variations of the present invention are possible in light of the above teachings, and references to specific values, part numbers, or standards are by way of example only. It is, therefore, to be understood that within the scope of the appended claims the invention may be practiced otherwise than as specifically described.

We claim:

1. A method for alerting a user of a mobile computer to a deteriorated communication condition between the mobile computer and a computer server linked to the mobile computer over a wireless link, the method comprising the steps of:

(1) calculating a packet transmission error rate, said calculating step comprising the steps of a. transmitting, from the mobile computer to the computer server, a plurality of Link Quality Test (LQT) packets;
   b. receiving the transmitted LQT packets at the computer server;
   c. determining whether an error-free reception of each received LQT packet occurred;
   d. transmitting an acknowledgment packet from the computer server to the mobile computer in response to each error-free reception; and
   e. calculating said packet transmission error rate in the mobile computer as a function of the number of acknowledgment packets received from the computer server;

(2) comparing the packet transmission error rate in the mobile computer with a threshold value to determine whether the deteriorated communication condition exists, and (3) indicating to the user, responsive to the determination that the packet transmission error rate exceeds the threshold value in said step (2), the deteriorated communication condition.

2. The method of claim 1, further comprising the step of retrieving a user-adjustable parameter for controlling one of said steps (1) to (3).

3. The method of claim 2, wherein said retrieving step comprises the step of retrieving a parameter for controlling how the indication of the deteriorated communication condition is presented to the user.

4. The method of claim 2, wherein said retrieving step comprises the step of retrieving a parameter for indicating the number of said plurality of LQT packets which are transmitted.

5. The method of claim 2, wherein said retrieving step comprises the step of retrieving a parameter for establishing a time period after which said steps (2) and (3) are automatically repeated.

6. The method of claim 2, wherein said retrieving step comprises the step of retrieving a parameter for establishing the threshold value.

7. The method of claim 1, wherein a plurality of threshold values are provided, said step (2) comprises comparing the packet transmission error rate to each of the plurality of threshold values, and wherein said step (3) comprises indicating the degree of the deteriorated communication condition according to the number of threshold values which are exceeded in said step (2).

8. The method of claim 1, further comprising the steps of:

(4) transmitting a second plurality of LQT packets between the mobile computer and the computer server during an initial time interval prior to said step (1);

(5) calculating, over the second plurality of LQT packets, a background transmission error rate; and (6) adjusting, based on the background transmission error rate, the threshold value.

9. The method of claim 1, further comprising the step of determining whether any non-LQT packets were transmitted between the mobile computer and the computer server during a previous time interval, and, responsive to a determination that such non-LQT packets were transmitted, inhibiting the step of transmitting the plurality of LQT packets.

10. The method of claim 1, further comprising the steps of:

(4) calculating a rate of change of the packet transmission error rate;

(5) determining whether the rate of change exceeds a predetermined rate; and (6) providing to the user, responsive to the determination that the rate of change exceeds the predetermined rate in said step (5), an indication that the rate of change has been exceeded.

11. The method of claim 1, wherein said step a. comprises the step of using LQT packets which each contain a plurality of data bytes and a cyclical redundancy check (CRC) code computed according to the plurality of data bytes; and wherein said step c. comprises the step of comparing the CRC code in each received LQT packet with the plurality of data bytes contained therein.

12. Apparatus for alerting a user of a mobile computer to a deteriorated communication condition between the mobile computer and a computer server linked to the mobile computer over a wireless link, the apparatus comprising:

calculating means for calculating a packet transmission error rate, said calculating means comprising first transmitting means for transmitting, from the mobile computer to the computer server, a plurality of Link Quality Test (LQT) packets;

receiving means for receiving the transmitted LQT packets at the computer server;

first comparing means for determining whether an error-free reception of each LQT packet occurred;

second transmitting means for transmitting an acknowledgment packet from the computer server to the mobile computer in response to the error-free reception of each LQT data packet; and computing means in the mobile computer for calculating said packet transmission error rate as a function of the number of acknowledgment packets received from the computer server;

second comparing means for comparing the packet transmission error rate with a threshold value to determine whether the deteriorated communication condition exists, and indicating means for indicating to the user, responsive to the determination that the packet transmission error rate exceeds the threshold value, the deteriorated communication condition.

13. The apparatus of claim 12, further comprising retrieving means for retrieving a user-adjustable parameter for controlling one of said calculating means, said second comparing means, and said indicating means.

14. The apparatus of claim 13, wherein said retrieving means retrieves a parameter for controlling how the indication of the deteriorated communication condition is presented to the user.

15. The apparatus of claim 13, wherein said retrieving means retrieves a parameter for indicating the number of said plurality of LQT packets which are transmitted.

16. The apparatus of claim 13, wherein said retrieving means retrieves a parameter for establishing a time period after which said second comparing repeats the comparison and said indicating means repeats the indication.

17. The apparatus of claim 13, wherein said retrieving means retrieves a parameter for establishing the threshold value.

18. The apparatus of claim 12, wherein a plurality of threshold values are provided, said second comparing means compares the packet transmission error rate to each of the plurality of threshold values, and wherein said indicating means indicates the degree of the deteriorated communication condition according to the number of threshold values which are exceeded as determined by said second comparing means.

19. The apparatus of claim 12, further comprising:

third transmitting means for transmitting a second plurality of LQT packets between the mobile computer and the computer server during an initial time interval;

second calculating means for calculating, over the second plurality of LQT packets, a background packet transmission error rate; and adjusting means for adjusting, based on the background packet transmission error rate, the threshold value.

20. The apparatus of claim 12, further comprising determining means for determining whether any non-LQT packets were transmitted between the mobile computer and the computer server during a previous time interval, and, responsive to a determination that such non-LQT packets were transmitted, inhibiting said first transmitting means from transmitting the plurality of LQT packets.

21. The apparatus of claim 12, wherein said calculating means further calculates a rate of change of the packet transmission error rate;

said second comparing means further compares the rate of change with a predetermined rate; and wherein said indicating means indicates to the user, responsive to the determination that the rate of change exceeds the predetermined rate, that the rate of change has been exceeded.

22. The apparatus of claim 12, wherein each of said LQT packets comprises a plurality of data bytes and a cyclical redundancy check (CRC) code computed according to the plurality of data bytes, and wherein said first comparing means compares the CRC code in each received LQT packet with the plurality of data types contained therein.

23. Apparatus for alerting a user of a mobile computer to a deteriorated communication condition between the mobile computer and a computer server linked to the mobile computer over a wireless link, comprising:

transmitting means for transmitting a predetermined number of LQT packets from the mobile computer to the computer server;

receiving means for receiving acknowledgments from the computer server, said acknowledgements corresponding to one or more of said predetermined number of LQT packets transmitted by said transmitting means;

determining means for determining whether any of the predetermined number of transmitted LQT packets was not acknowledged by the computer server;

retransmitting means for retransmitting, responsive to said determining means, any LQT packets not acknowledged by the computer server;

computing means for computing, based on the number of LQT packets acknowledged by the computer server, a transmission error rate;

comparing means for comparing the transmission error rate with a predetermined threshold; and indicating means for indicating, responsive to the transmission error rate exceeding the predetermined threshold, an alert to the user representing the deteriorated communications condition.

24. The apparatus of claim 23, further comprising repeating means for automatically repeating the transmission of the predetermined number of LQT packets according to a predetermined time interval.

25. The apparatus of claim 24, wherein the predetermined time interval is adjustable by the user.

26. The apparatus of claim 23, wherein the predetermined number of LQT packets is adjustable by the user.

27. The apparatus of claim 23, wherein the predetermined threshold is adjustable by the user.

28. The apparatus of claim 23, wherein the indicating means is responsive to a user-supplied parameter.

29. A mobile computer, comprising:

a computer bus, a processor, coupled to the computer bus, having means for generating a plurality of link quality test (LQT) packets for transmission over a wireless link to a computer server and means for determining, responsive to the number of error-free acknowledgments received from the computer server for said generated LQT packets, the communications quality over the wireless link, a communications adapter, coupled to the computer bus, for modulating said generated LQT packets onto a radio frequency signal and transmitting said modulated LQT packets over said wireless link to said computer server, and for receiving and demodulating said acknowledgements from said computer server over said wireless link; and a communications quality indicator for indicating the communications quality to a user.

30. The mobile computer of claim 29, wherein said communications quality indicator comprises:

a graphics interface, coupled to the computer bus, for generating a display image corresponding to the determined communication quality; and a graphics display, coupled to said graphics interface, for displaying said display image.

\* \* \* \* \*